F. H. OGDEN.
FRICTION CLUTCH.
APPLICATION FILED OCT. 12, 1910.
1,001,432.
Patented Aug. 22, 1911.
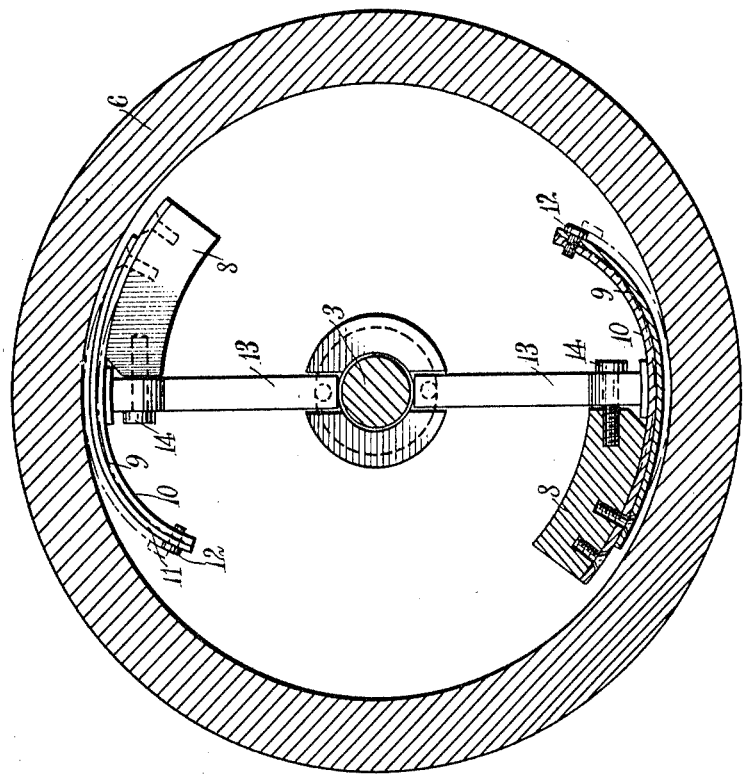
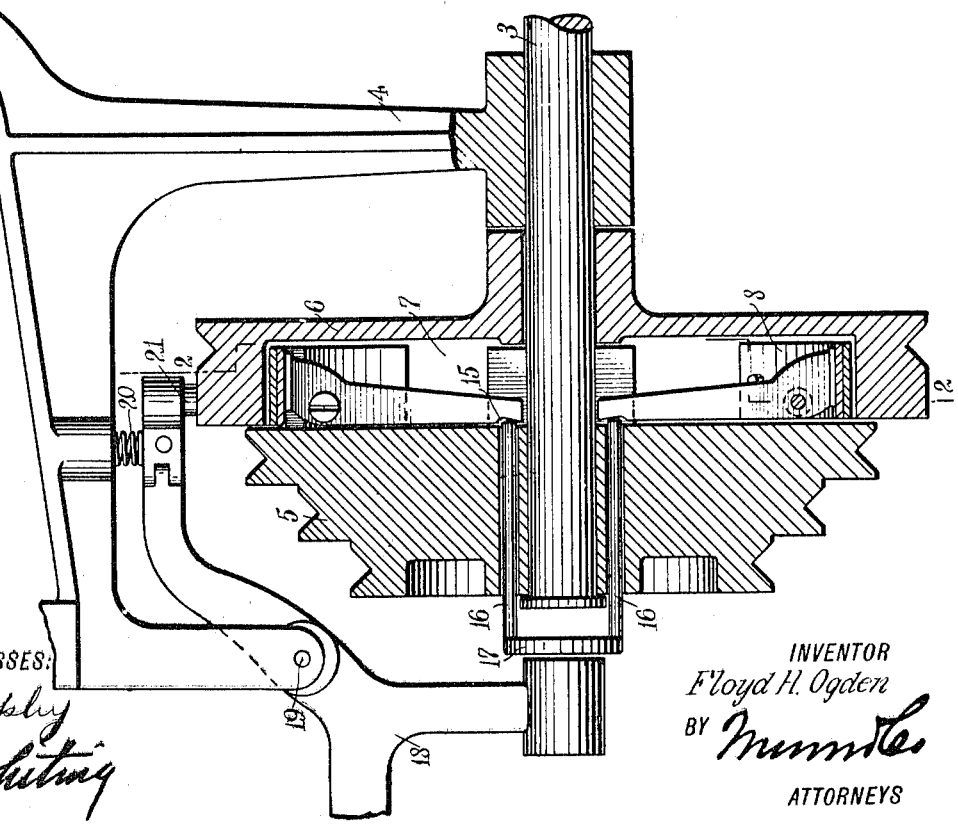
WITNESSES:
INVENTOR
Floyd H. Ogden
BY
ATTORNEYS

UNITED STATES PATENT OFFICE.

FLOYD HAYTH OGDEN, OF BOSTON, MASSACHUSETTS, ASSIGNOR OF ONE-HALF TO DANIEL McMILLAN, OF BOSTON, MASSACHUSETTS.

FRICTION-CLUTCH.

1,001,432.    Specification of Letters Patent.    Patented Aug. 22, 1911.

Application filed October 12, 1910. Serial No. 586,635.

*To all whom it may concern:*

Be it known that I, FLOYD HAYTH OGDEN, a citizen of the United States, and a resident of Boston, in the county of Suffolk and State of Massachusetts, have invented a new and Improved Friction-Clutch, of which the following is a full, clear, and exact description.

This invention relates to a friction clutch which may be used to connect a driven member to a driving member in any suitable machinery, but is particularly adapted to transmitters for sewing machines, countershafts, automobiles, etc.

An object of this invention is to provide a device which will be simple in construction, inexpensive to manufacture, strong, durable, readily accessible, extremely sensitive in its operation, and unaffected by oil.

A further object of this invention is to provide a plurality of members adapted to be driven one from the other, one of said members having a plurality of spring contact members adapted to be forced into engagement with a clutch face on the other member.

These and further objects, together with the construction and combination of parts, will be more fully described.

Reference is to be had to the accompanying drawings forming a part of this specification, in which similar characters of reference indicate corresponding parts in both views, and in which—

Figure 1 is a vertical section; and Fig. 2 is a transverse vertical section on the line 2—2 of Fig. 1.

Referring more particularly to the separate parts of the device, 3 indicates a shaft supported in suitable bearings in a frame 4. On the shaft 3, there are provided a pair of members 5 and 6, either of which may be the drive member and the other the driven member. In this case, we will assume that the member 5, which is in the form of a step pulley, is the driving member, and the member 6, which is in the form of a pulley, the driven member. The pulley 6 is provided with a cavity 7, the peripheral surface of which forms a clutch face. Extending into this cavity 7, there are provided on the member 5 a plurality of lugs 8, which form supports for clutch contacts 9, which may be in any suitable form, but are shown in this case in the form of curved leaf springs 10 faced with a friction layer 11, which may be of any suitable material, such as leather, and which may be secured to the springs 10 and the lugs 8 by any suitable means, such as screws 12. These clutch contacts 9 are normally held out of engagement with the clutch face on the pulley 6, by reason of the tension in the springs 10. For the purpose of forcing these clutch contacts into engagement with the clutch face on the pulley 6, there are provided bell crank levers 13, which are pivotally connected to the lugs 8 by any suitable means, such as screw pivots 14, and engage the inner surfaces of the clutch contacts at one end. The opposite ends of the levers 13 are provided with recesses 15, whereby they may be readily engaged by pins 16 extending through openings in the member or step pulley 5.

In order to operate the pins 16, the shaft 3 may be extended and a collar slidingly mounted thereon and connected to the pins 16, the latter being operated by a suitable bifurcated lever. In this case, however, the pins are shown as being connected by a head 17, which is engaged by one arm of a double bell crank lever pivoted to the frame 4 at 19. This arm of the lever 18 is normally held out of engagement with the head 17 by means of a spring 20, which also serves to force a brake 21 into engagement with the periphery of the pulley 6, to stop the rotation thereof.

The operation of the device will be readily understood when taken in connection with the above description.

Under normal conditions, the members 5 and 6 are not connected in driving relation, as the springs 10 on the clutch contacts 9 hold these clutch contacts from engagement with the clutch face on the member 6.

If it should be desired to connect the members 5 and 6 in driving relation, it is merely necessary to force the pins 16 inwardly by means of the double bell crank lever 18, which will thereby swing the eccentric or bell crank levers 13 so as to force the contact members 9 into engagement with the clutch face on the member 6 against the tension of their springs 10. By this movement, the brake 21 is simultaneously removed from the peripheral surface of the member 6, thereby permitting this member to rotate. When the pressure on the lever 18 is released, the members 5 and 6 will be automatically disconnected from driving relation, and the brake 21 automatically applied to the pulley 6.

While I have shown one embodiment of my invention, I do not wish to be limited to the specific details thereof, but desire to be protected in various changes, modifications and alterations which may come within the scope of the appended claim. For example, any other type of lever mechanism for operating the pins 16 and the eccentric levers 13 may be utilized.

Having thus described my invention, I claim as new and desire to secure by Letters Patent:—

The combination with a driving member, of a driven member, one of said members having a clutch face thereon, lugs on the other of said members, curved leaf springs secured to said lugs, friction layers on said leaf springs, adapted to engage said clutch face, normally held out of engagement with said clutch face by said springs, bell crank levers pivotally connected to said lugs, adapted to force said layers into engagement with said clutch faces, pins inserted through one of said members and operatively engaging said levers, and means for operating said pins.

In testimony whereof I have signed my name to this specification in the presence of two subscribing witnesses.

FLOYD HAYTH OGDEN.

Witnesses:
E. CLEAVES HADLEY,
JOHN J. CONNOLLY.